3,597,414
PROCESS FOR THE REDUCTION OF NITROBENZENE-3,4-DICARBOXYLIC ACID TO AZO AND AZOXY COMPOUNDS

Max Gruffaz and Bernard Rollet, Lyon, France, assignors to Rhone-Poulenc S.A., Paris, France
No Drawing. Filed Oct. 30, 1967, Ser. No. 679,237
Claims priority, application France, Nov. 8, 1966, 82,938
Int. Cl. C07d 27/00
U.S. Cl. 260—143    6 Claims

ABSTRACT OF THE DISCLOSURE

Azobenzene-3,3',4,4'-tetracarboxylic acid and azoxybenzene-3,3',4,4'-tetracarboxylic acid are made by reducing nitrobenzene-3,4-dicarboxylic acid with aluminium in an aqueous alkali metal hydroxide solution.

---

The present invention relates to the reduction of nitrobenzene-3,4-dicarboxylic acid to azobenzene-3,3',4,4'-tetracarboxylic acid:

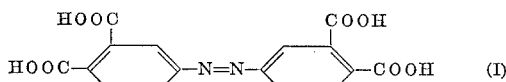

and to azoxybenzene-3,3',4,4'-tetracarboxylic acid:

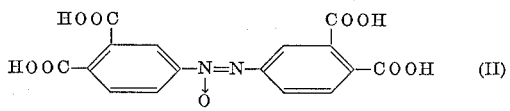

The preparation of the tetra-acids (I) and (II) by reduction of nitrobenzene-3,4-dicarboxylic acid has already been mentioned. Sodium amalgam in the presence of a dilute aqueous solution of sodium hydroxide [Bogert and Collaborators, J. Amer. Chem. Soc. 23, 759 (1901)] and alcoholic potassium hydroxide [Goldberger, Monatsh. 37, 57 (1916)] have been proposed as reducing agents but neither of the two working methods allows the reaction to be carried out satisfactorily on an industrial scale. In the process using the amalgam, an amalgam of low sodium concentration, and which is hence very dense, is generally used; it is then difficult to make good contact between the amalgam and the compound to be reduced. The use of alcoholic potassium hydroxide, on the other hand, requires very critical experimental conditions which have not been rigorously determined (Goldberger, loc. cit.).

The present invention provides a new process for the reduction of nitrobenzene-3,4-dicarboxylic acid to azobenzene-3,3',4,4'-tetracarboxylic acid and azoxybenzene-3,3', 4,4'-tetracarboxylic acid which comprises reducing the said dicarboxylic acid with aluminium in the presence of an aqueous solution of an alkali metal hydroxide. This process gives excellent yields and furthermore has the advantage of employing a reducing agent which is cheap and easy to use.

The aluminium is preferably used in a divided state, for example as a powder. It is not necessary to use pure metal and ordinary commercially available aluminium containing 99% to 99.9% of metal is equally suitable.

The alkali metal hydroxide is employed as an aqueous solution whose concentration may vary within wide limits without affecting the reaction; however for economic reasons which aim to reduce the volume of equipment as much as possible, relatively concentrated solutions containing of the order of 5 to 10 mols of hydroxide per litre are preferably employed. From this point of view, concentrated commercially available sodium hydroxide solutions can advantageously be employed.

The respective amounts of aluminium and alkali metal hydroxide principally depend on the stage at which one wishes to stop the reduction, that is to say on the nature of the acid which one wishes to obtain.

Where the tetra-acid (I) is desired 4/3 gram atoms of aluminium per molecule of nitrobenzene-3,4-dicarboxylic acid are theoretically required and it is generally of no value to exceed this proportion by too much (e.g. by using more than 1.4 gram-atoms), so as to avoid the formation of by-products caused by excessive reduction. The amount of alkali metal hydroxide should also be so chosen that it is in excess of the quantity required to liberate the hydrogen needed for the reduction. Proportions ranging from 3.5 to 7 mols of alkali metal hydroxide per mol of nitrobenzene-3,4-dicarboxylic acid are generally suitable.

If, on the other hand, the tetra-acid (II) is desired, one gram atom of aluminium per molecule of 3,4-nitrobenzene-dicarboxylic acid is theoretically required. In this case it is in practice preferable to work with less than the theoretical amount of aluminium; 0.6 to 0.8 gram atoms of metal are generally used per mole of acid to be reduced, and the unconverted acid can be recovered for a subsequent reduction. The amount of alkali metal hydroxide may generally be 3 to 6 mols per mol of acid subjected to the reduction.

The reaction temperature must be sufficient to take the reduction to the required stage, taking into account the amount of reducing agent employed. The process is advantageously carried out at between 0° and 50° C., preferably between 15° C. and 30° C., to obtain the tetra-acid (I), and below 20° C. if the tetra-acid (II) is desired.

In practice, to carry out the reduction, the nitrobenzene-3,4-dicarboxylic acid is dissolved in a part or all of the aqueous solution of alkali metal hydroxide and the aluminium is then gradually introduced. If only a part of the alkali metal hydroxide solution has been introduced before the aluminium, the rest of this solution is then preferably added gradually at the same time as the aluminium. The mixture is kept at the desired temperature, if desired by heat exchange with the outside of the vessel. When the reaction has taken place, the tetra-acid is precipitated by adding a strong inorganic acid and is then separated by conventional means.

Nitrobenzene-3,4-dicarboxylic acid, commonly called 4-nitrophthalic acid, is easily available from ortho-phthalic acid or its anhydride or imide. An advantageous process for obtaining it consists of nitrating phthalimide and then treating the 4-nitrophthalimide so obtained first with an alkali metal hydroxide with heating and then with an inorganic acid. A description of this preparation may be found, for example in "Organic Syntheses," Collective Vol. II, page 457.

In order to carry out the process of the invention it is not essential to start from pure nitrobenzene-3,4-dicarboxylic acid. It is for example possible to use directly solutions of the acids such as those which are obtained after reacting 4-nitrophthalimide with an aqueous solution of an alkali metal hydroxide with heating.

The tetra-acids (I) and (II) may be converted into their dianhydrides by the usual processes, for example by heating or by reaction with a dehydrating agent such as an anhydride of a lower organic acid. These tetra-acids and their anhydrides are raw materials of great value for the preparation of various polycondensates. For example, by reaction of their anhydrides with diamines, such as hexamethylene diamine or p-phenylene diamine, at elevated temperatures, they may be converted into polyimides which may be used as adhesives in the production of laminates e.g. of glass fibre fabric.

The following examples illustrate the invention. In these examples, given without implying a limitation, the aluminium used is 99.5% pure aluminium powder of particle size such that it passes through a sieve having a mesh size of 160μ.

EXAMPLE 1

15.5 g. (0.0734 mol) of nitrobenzene-3,4-dicarboxylic acid are dissolved in a mixture of 120 g. of water and 20 g. of an aqueous solution of sodium hydroxide (containing 400 g. of hydroxide per litre), and 2.7 g. of aluminium powder and 10 cm.³ of an aqueous sodium hydroxide solution (containing 400 g. of hydroxide per litre) are then added gradually and simultaneously over the course of two hours with stirring. During this procedure, the reaction temperature is kept at 18°–20° C. by external cooling. When the addition is complete, the mixture is left at 25°–28° C. with stirring for two hours and the azobenzene-3,3',4,4'-tetracarboxylic acid is then precipitated by pouring the mixture into 80 cm.³ of a concentrated aqueous solution of hydrochloric acid (containing 415 g. of acid per litre) over the course of 15 minutes. After cooling the precipitate is filtered off, washed with water until the chloride ions have disappeared, and dried in an oven at 130° C. for 15 hours; 11.1 g. of azobenzene-3,3',4,4'-tetracarboxylic acid are thus obtained. The yield is 84.5%.

EXAMPLE 2

100 g. (0.52 mol) of 4-nitrophthalimide are added to a mixture of 400 cm.³ of water and 130 cm.³ of an aqueous sodium hydroxide solution containing 400 g./litre. The mixture is rapidly heated to boiling and boiled for 10 minutes. It is then cooled and a solution of the sodium salt of nitrobenzene-3,4-dicarboxylic acid is obtained, to which 112.5 cm.³ of an aqueous solution of sodium hydroxide containing 400 g./litre are added followed gradually and simultaneously by 18.3 g. of aluminium powder and 112.5 cm.³ of an aqueous sodium hydroxide solution (containing 400 g. of hydroxide per litre). The process is completed with stirring and whilst the temperature of the mixture is maintained at 18°–20° C. by external cooling.

The procedure of the preceding example is then followed, precipitation being carried out by adding a solution obtained from 230 cm.³ of water and 670 cm.³ of an aqueous solution of concentrated hydrochloric acid (415 g. of acid per litre). 85.5 g. of azobenzene-3,3',4,4'-tetracarboxylic acid are finally obtained.

EXAMPLE 3

800 g. of 4-nitrophthalimide are added in a mixture of 2.5 litres of water and 795 cm.³ of an aqueous solution of sodium hydroxide (containing 300 g. of hydroxide per litre). The mixture is rapidly heated to boiling, boiled for 15 minutes, and then cooled to 0° C.

108 g. of aluminium and 540 cm.³ of an aqueous solution of sodium hydroxide containing 300 g./litre are gradually and simultaneously introduced into this solution over the course of six hours, with stirring, whilst the temperature of the mass is kept close to 0° C. When the addition is complete, the mixture is kept at this temperature for a further hour with stirring and then filtered. The filtrate is then poured into 2.5 litres of a concentrated aqueous solution of hydrochloric acid over the course of 30 minutes. The resulting paste is diluted by adding 1.5 litres of water and the precipitate is then filtered off, washed and dried as stated in Example 1. 584.5 g. of a dry product which is azoxybenzene-3,3',4,4'-tetracarboxylic acid are finally obtained.

We claim:
1. Process for the production of azobenzene-3,3',4,4'-tetracarboxylic acid and azoxybenzene-3,3',4,4'-tetracarboxylic acid, which comprises reducing nitrobenzene-3,4-dicarboxylic acid at a temperature of 0°–50° C. with aluminium in the presence of an aqueous sodium hydroxide solution, using from 0.6–1.4 gram atoms of aluminium and 3–7 mols of sodium hydroxide for each mol of nitrobenzene-3,4-dicarboxylic acid.

2. Process according to claim 1 in which 4/3 gram-atoms of aluminium and 3.5 to 7 mols of sodium hydroxide are used per mol of dicarboxylic acid and azobenzene-3,3',4,4'-tetracarboxylic acid is isolated as major product.

3. Process according to claim 1 in which 0.6 to 0.8 gram-atoms of aluminium and 3 to 6 mols of sodium hydroxide are used per mol of dicarboxylic acid and azoxybenzene-3,3',4,4'-tetracarboxylic acid is isolated as major product.

4. Process according to claim 2 in which the reduction is effected at 15° to 30° C.

5. Process according to claim 3 in which the reduction is effected at 0° to 20° C.

6. Process according to claim 1 in which the nitrobenzene-3,4-dicarboxylic acid is used as the solution obtained by reacting 4-nitrophthalimide with an aqueous solution of sodium hydroxide with heating.

References Cited

UNITED STATES PATENTS 3,063,980  11/1962  Bloom et al. _____ 260—205

CHARLES B. PARKER, Primary Examiner

D. M. PAPUGA, Assistant Examiner

U.S. Cl. X.R.

260—207.1, 689